Jan. 27, 1970  A. R. EMERY  3,492,456
METHOD AND MEANS FOR CONTROLLING THE PATH OF A BEAM OF
ELECTRICALLY CHARGED PARTICLES
Filed Dec. 22, 1966  9 Sheets-Sheet 1
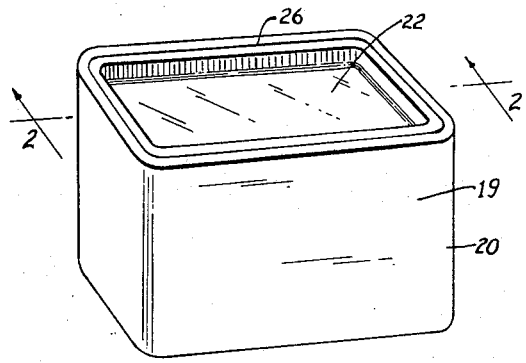
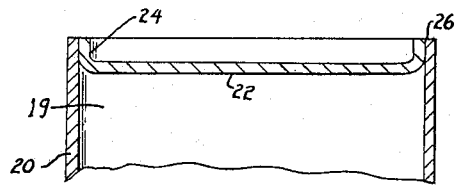
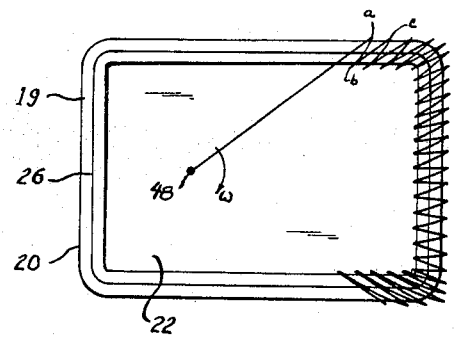
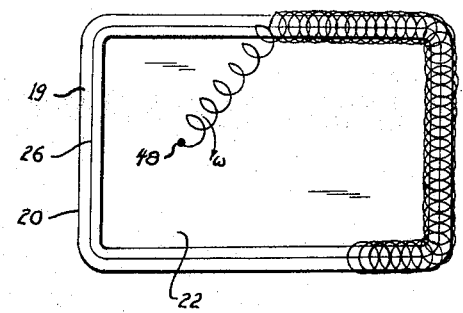
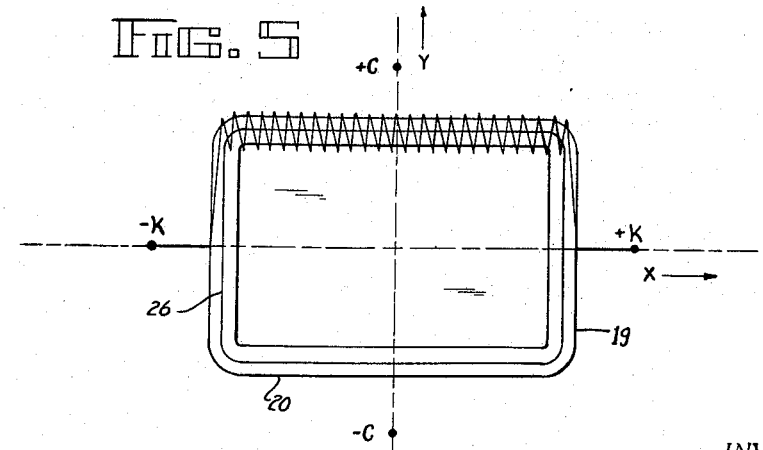
INVENTOR.
ARTHUR R. EMERY
BY
McCormick, Paulding & Huber
ATTORNEYS

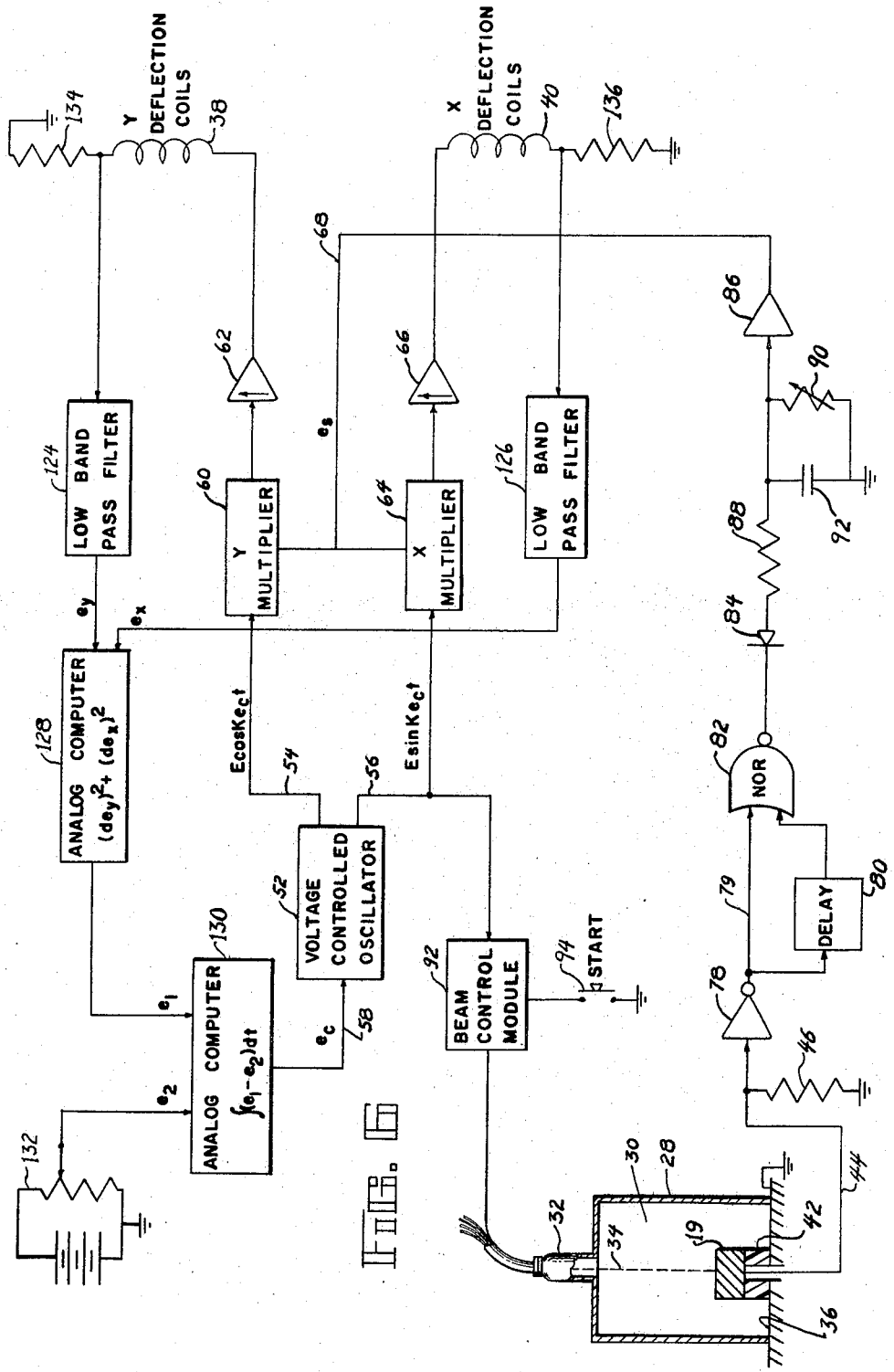

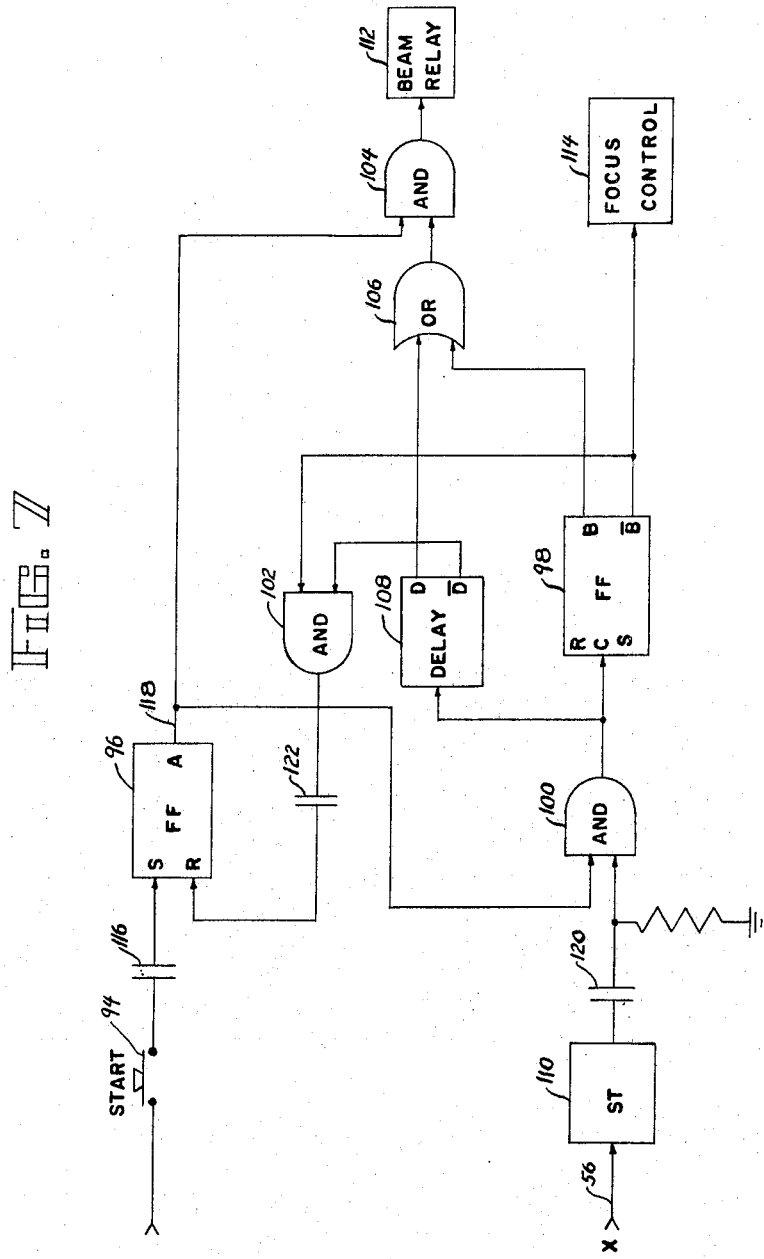

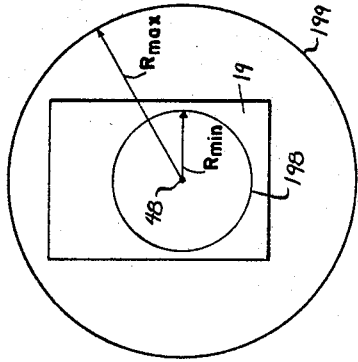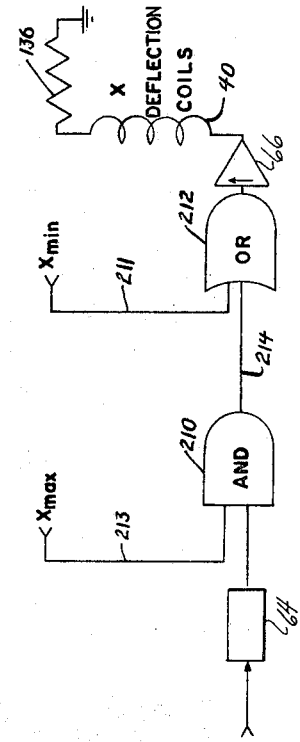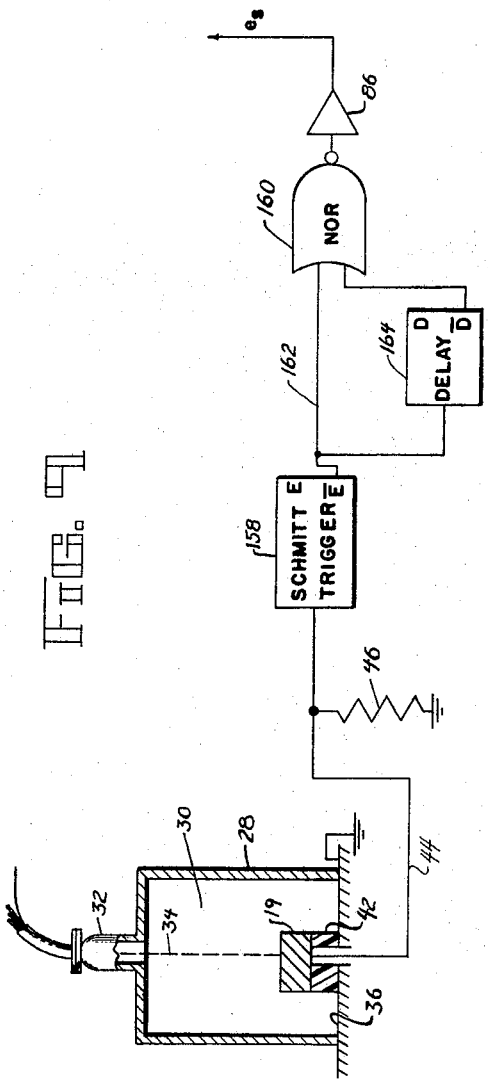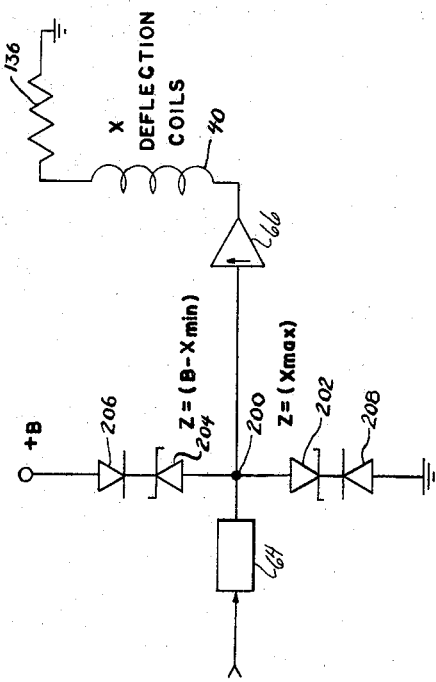

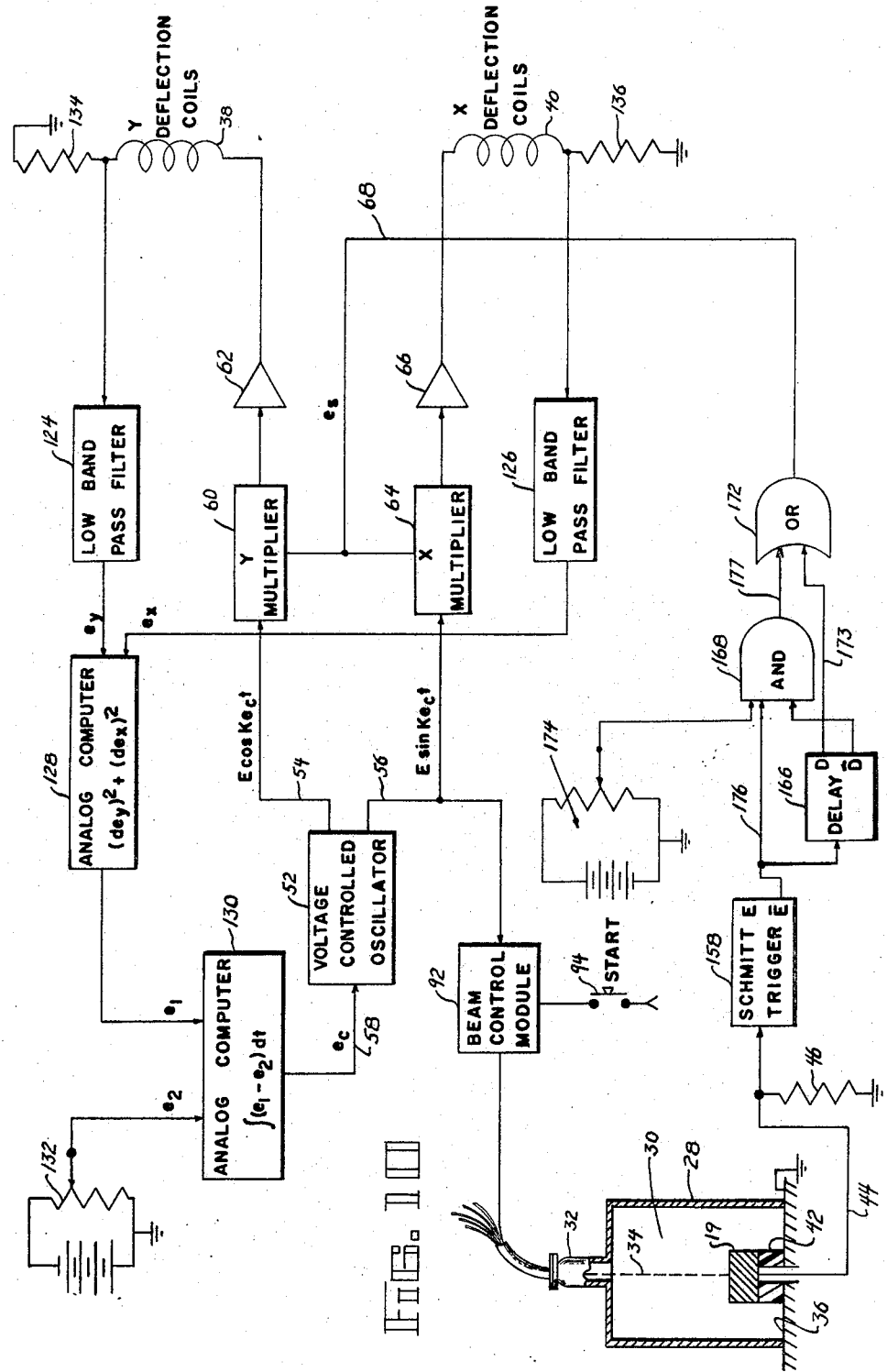

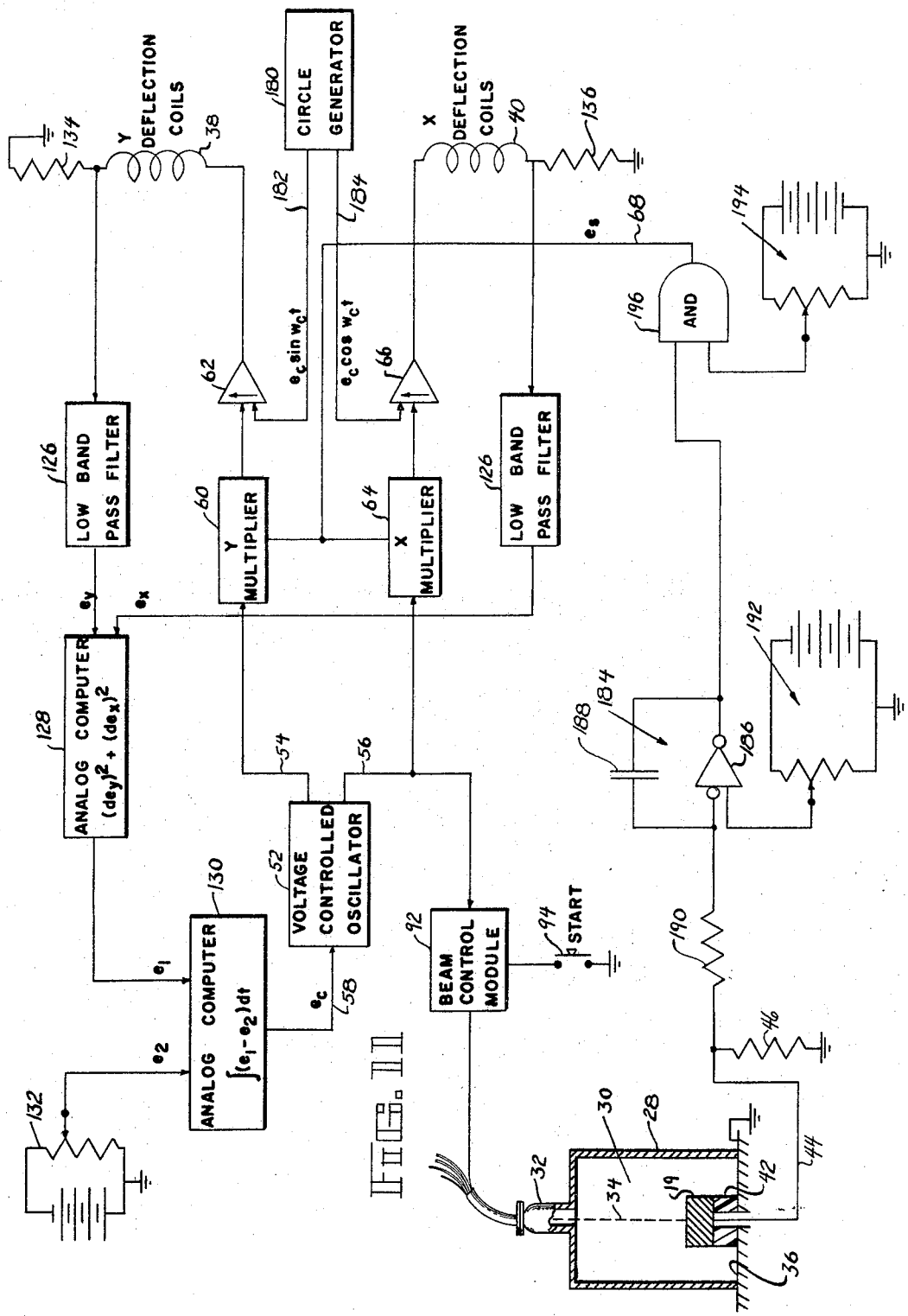

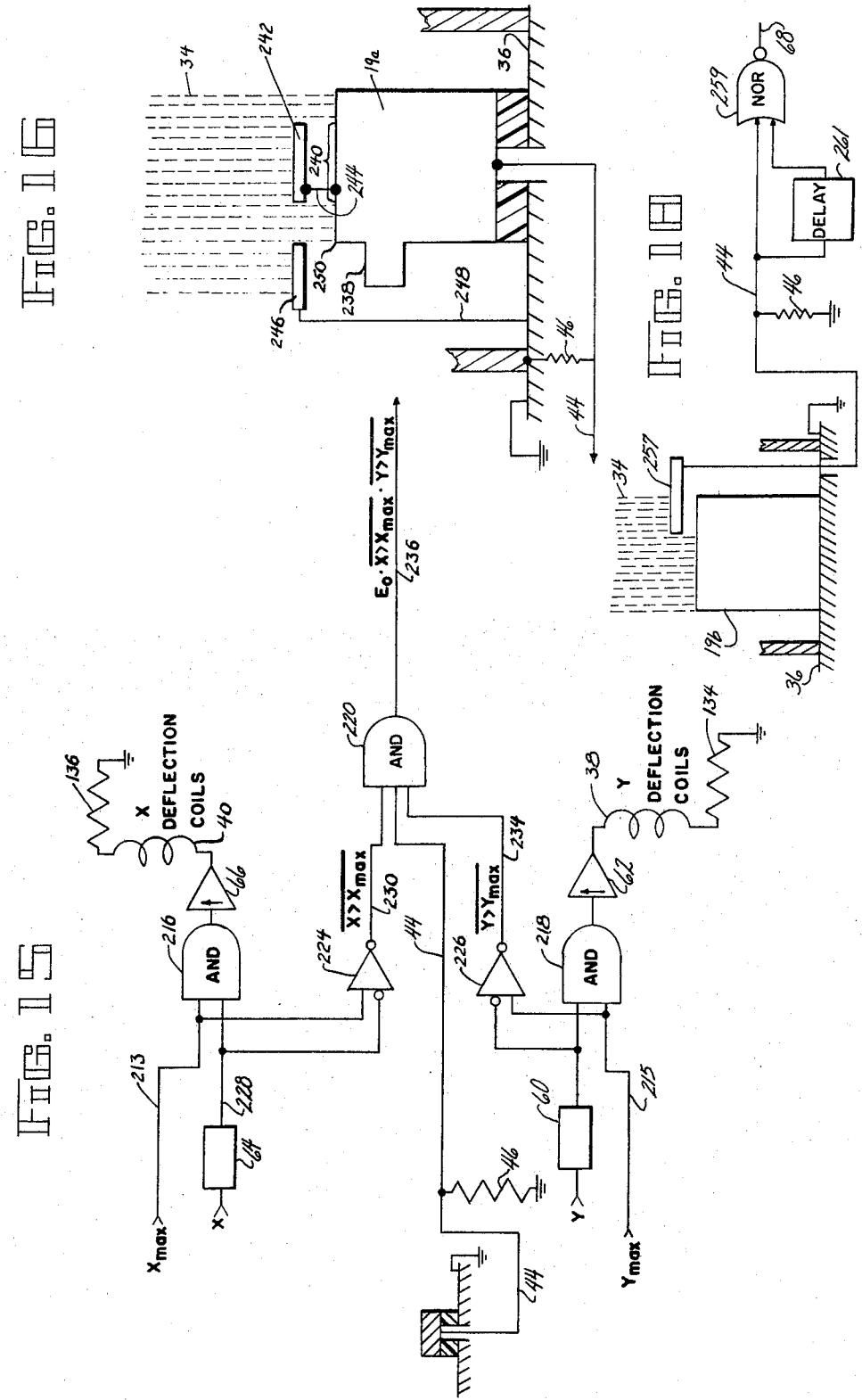

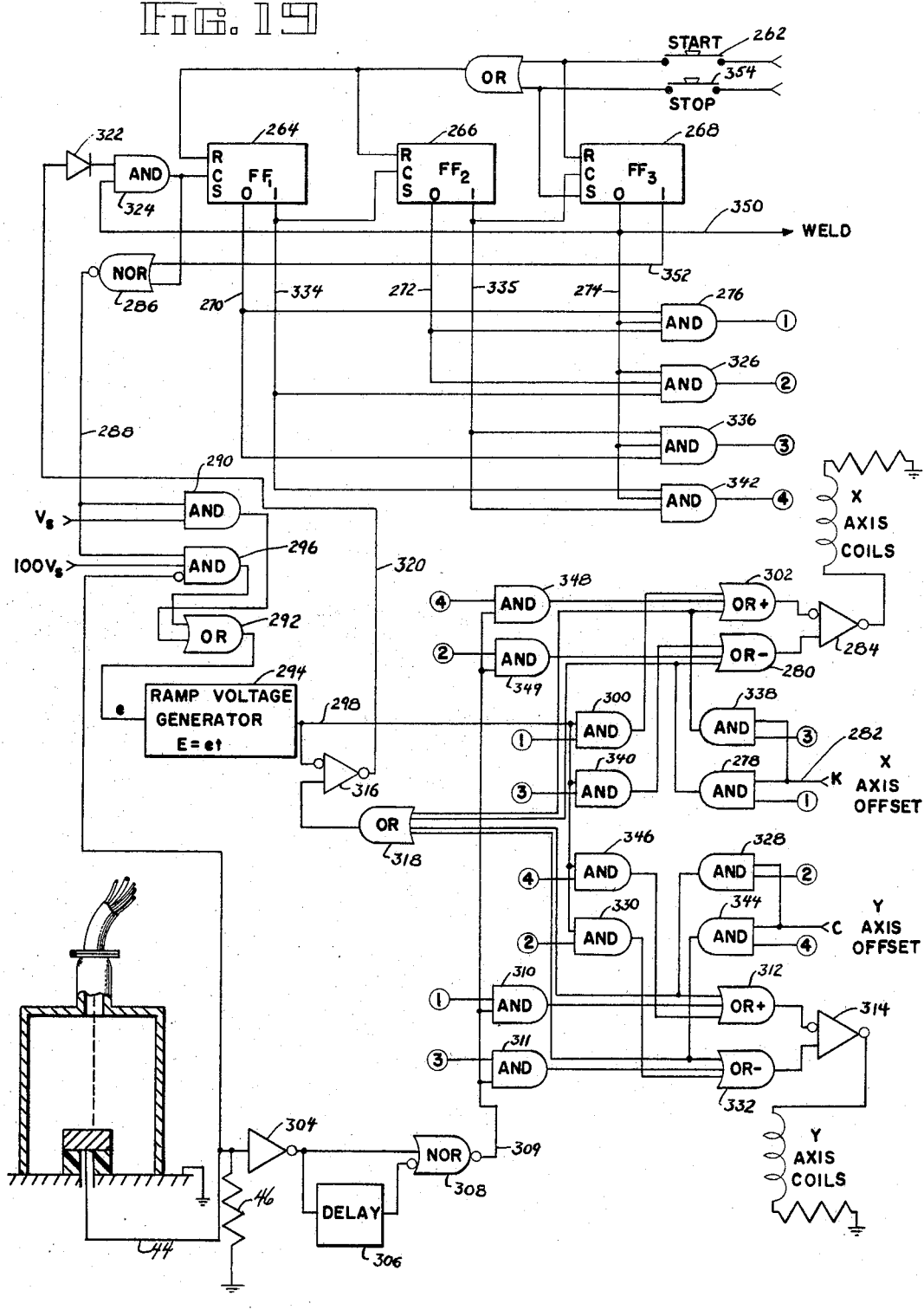

United States Patent Office 3,492,456
Patented Jan. 27, 1970

1

3,492,456
METHOD AND MEANS FOR CONTROLLING
THE PATH OF A BEAM OF ELECTRICALLY
CHARGED PARTICLES
Arthur R. Emery, Windsor Locks, Conn., assignor to
Hi-G, Incorporated, Windsor Locks, Conn., a corporation of Connecticut
Filed Dec. 22, 1966, Ser. No. 604,057
Int. Cl. B23k 9/00
U.S. Cl. 219—121                                14 Claims

ABSTRACT OF THE DISCLOSURE

A method of controlling the movement of an electron beam across an article to be welded. The beam is deflected so as to follow a desired line path on the article positioned in its field of movement. An electrically conductive zone is positioned adjacent one side of the article through an electrical resistance so that a substantially different potential difference is produced between the article and zone when the zone is struck by the beam than when the article is struck by the beam. The value of said potential difference therefore indicating the side of said line on which the beam is located, and controlling the deflection of the beam relative to the given axis in response to the potential difference.

---

As an example, the method and means of this invention are particularly useful in association with an electron beam welding machine for automatically moving the electron beam produced by the machine along a weld line on a workpiece. The flow of electrons in such a beam is synonymous with an electric current, and this current is utilized by the invention to produce voltage signals indicating the presence of the beam on one side or the other of the weld line. These voltage signals are in turn used to control the general path of the beam with the beam rapidly moving, in a stitching motion, from one side to the other of such general path as it moves therealong. In the description which follows the invention, for convenience, is described as applied to an electron beam welder. It should be understood, however, that the invention is not necessarily limited to use with such a machine nor even to use with an electron beam. Instead it may be used with any type of beam of charged particles essentially constituting an electric current. In an electron beam welder the stitching motion of the beam as it follows the desired weld line is usually necessary to the welding process performed by the beam. In other applications such stitching motion may, however, serve no useful function other than being a part of the line following process.

A general object of this invention is to provide a method and means for causing a beam of electrically charged particles to automatically follow a desired line on a workpiece or other article toward which the beam is directed.

A more particular object of this invention is to provide a method and means for automatically controlling the path of a beam of electrically charged particles so as to cause the beam to move along a given line and at the same time to move back and forth across such line with a stitching motion. In keeping with this object, a further object is to provide a method and means especially useful for controlling the path of the beam of an electron beam welder and whereby the beam may be automatically moved along a weld line on a workpiece to produce a superior uniform weld, the automatic path control eliminating most of the manual manipulation previously required and increasing the output of the welder.

2

Other objects and advantages will be apparent from the following description and from the drawings forming a part hereof.

The drawings show preferred embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Of the drawings:

FIG. 1 is a perspective view of an article to be welded on an electron beam welder utilizing the beam path control means of this invention.

FIG. 2 is a fragmentary vertical sectional view taken on the line 2—2 of FIG. 1.

FIG. 3 is a plan view of the article in FIG. 1 and shows the path followed by the electron beam when such path is controlled by a control means comprising one embodiment of this invention.

FIG. 4 is a plan view of the article of FIG. 1 and shows the path of the beam when such path is controlled by a control means comprising another embodiment of this invention.

FIG. 5 is a plan view of the article of FIG. 1 and shows the path of the beam when controlled by a control means comprising still another embodiment of this invention.

FIG. 6 is a schematic diagram illustrating a beam path control means or system embodying the present invention.

FIG. 7 is a schematic diagram illustrating the beam control module of the FIG. 6 system.

FIG. 9 is a fragmentary schematic diagram of a beam path control means or system comprising another embodiment of this invention.

FIG. 10 is a schematic diagram illustrating a beam path control means or system comprising another embodiment of this invention.

FIG. 11 is a schematic diagram illustrating a beam path control means or system comprising still another embodiment of this invention.

FIG. 12 is a diagram illustrating the maximum and minimum limits the beam deflection must be capable of attaining in order to properly weld a workpiece in accordance with one aspect of this invention.

FIG. 13 is a schematic diagram showing a circuit for setting maximum and minimum limits on the deflection of the beam in a control means embodying this invention.

FIG. 14 is a schematic diagram illustrating another circuit for establishing maximum and minimum limits on the deflection of the beam in a control means embodying the present invention.

FIG. 15 schematically illustrates an electrical circuit for establishing a maximum limit for the deflection of the beam in a control means embodying this invention and for producing a signal simulating the movement of the beam from the workpiece when such maximum limit is reached.

FIG. 16 is a view illustrating the use of masks to prevent the beam from striking areas of a workpiece in which areas its presence is undesired.

Figure 17:
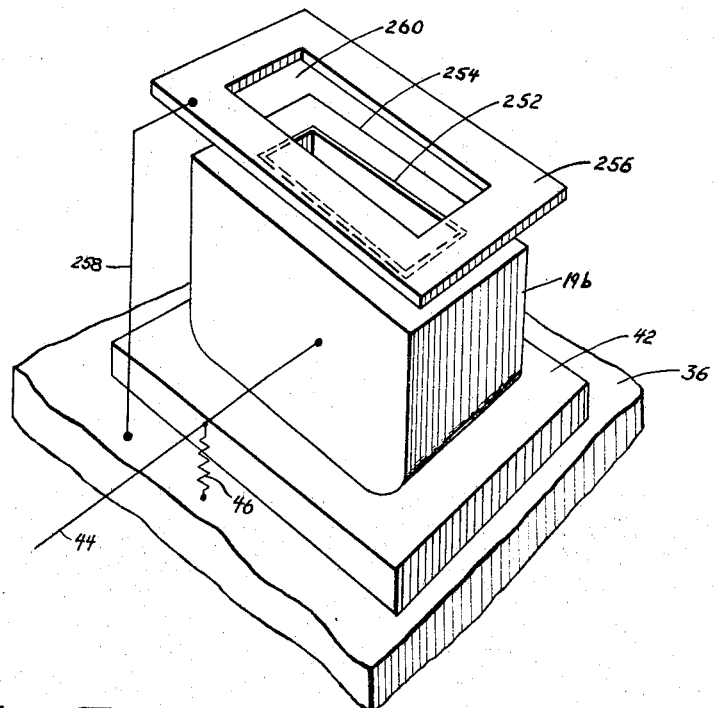

FIG. 17 is a perspective view illustrating the use of a mask for causing the beam to follow a line or seam located quite some distance from the edge of the workpiece.

FIG. 18 is a schematic diagram illustrating a modified circuit for use with a mask as in FIG. 17.

FIG. 19 is a schematic diagram illustrating a beam path control means comprising still another embodiment of this invention.

Turning now to the drawings and first considering FIGS. 1 and 2, these two figures show an exemplary workpiece 19 to be welded in an electron beam welding machine the beam of which is automatically controlled in accordance with the control means of this invention. The workpiece 19 is in the form of a generally rectangular metal can comprised of a relatively deeply drawn body 20 and a less deeply drawn base or closure 22. The base 22 includes an outwardly directed peripheral flange 24 located within the body 30 and having its free end face flush with the end face of the body so that the end faces define therebetween a continuous generally rectangular seam 26. The seam 26 is the line along which welding is to be performed by the electron beam being moved back and forth thereacross as it is moved therealong, thereby welding the base 22 to the body 20. The article shown in FIGS. 1 and 2 may, for example, be a relay can for containing a relay, and the base 22 may be a header through which various terminals (not shown) of the relay extend. In such a case the welding of the article along the seam 26 is performed in order to hermetically seal the relay in the can. It should be understood, however, that the article 19 is shown by way of example only and that this invention may be used with an infinite variety of workpieces.

In accordance with the invention, the beam of the electron beam welder is automatically controlled to cause it to follow the seam or line 26 to be welded. Turning to FIG. 6, a typical electron beam welder is shown at 28 in this figure and includes a vacuum chamber 30 within which one or more workpieces, such as that shown at 19, may be placed. In the upper portion of the welder is a beam generator 32 which produces a beam of electrons 34 directed toward an electrode 36, the electrode 36 in the illustrated case being at ground potential. The beam 34 moves generally along a central vertical axis but is deflectable, by deflection means included in the beam generator 32, in two mutually perpendicular directions relative to such axis so as to be movable to any position over a given field of movement located in a plane perpendicular to the central vertical axis. In the illustrated case the deflection means employed comprise a set of one or more Y deflection coils, indicated at 38, for magnetically deflecting the beam 34 along one axis, the Y axis, of its field of movement, and a set of one or more X deflection coils, indicated at 40, for deflecting the beam 34 along another axis, the X axis, of its field of movement perpendicular to the Y axis. Although the X and Y deflection coils 38 and 40 are shown apart from the welder 28 it will, of course, be understood that they are in actuality located in the upper portion of the welder with the remainder of the beam generator, focusing means and other conventional parts (not shown) of the beam generator also being located at the upper part of the welder. The deflection coils 38 and 40 have been shown by way of example and it should be understood that the invention is in no way limited to use with such a magnetic deflection means. If desired the beam path control means of this invention may be used with an electron beam welder having electrostatic deflection means.

The beam 34, being a flow of electrons, forms essentially an electric current so that articles struck by the beam take on an electrical potential the value of which is dependent on the relationship of the article to other elements in the electrical circuit of which it becomes a part. In accordance with this invention, the article 19 is so arranged in the vacuum chamber 30 and so combined with other suitable means that when the beam 34 is located on one side of the line to be welded it strikes the article to give the article one value of electrical potential and when the beam is located on the other side of the line to be welded it strikes an electrically conductive zone which is connected with the article through an electrical resistance so as to give the article a different electrical potential. This differing electrical potential is used, as explained in more detail hereinafter, to sense the line and to cause the beam to move therealong. The presence of an electrically conductive zone located on one side of the line to be welded and connected with the article through an electrical resistance may be obtained in various different ways. As shown in FIG. 6, where the seam to be welded is located adjacent the outer edge or periphery of the article, the desired arrangement may be obtained by placing the article 19 on a piece of electrical insulating material 42 located between the bottom of the article 19 and the electrode 36. An electrical conductor 44 is in turn connected with the article 19 and is connected to ground through a resistor 46.

The article 19 is placed on the insulation 42 with the seam 26 facing upwardly toward the beam generator 32. Therefore, when the beam 34 strikes the article 19 the electrical circuit of the beam passes through the article 19, the conductor 44 and the resistor 46 to ground to give the article 19 a negative potential relative to ground. As the beam 34 is deflected toward the seam 26, however, it, shortly after crossing the seam, moves off of the edge of the article and strikes the electrode 36, the electrode in this case comprising the electrically conductive zone. When the beam so strikes the electrode the article 19 no longer forms a part of the electrical circuit and it is accordingly given a zero electrical potential by virtue of its connection to ground through the resistor 46. A negative potential in the article 19 therefore indicates the presence of the beam on the article and a zero potential on the article indicates the presence of the beam off of the article. Since the seam 26 to be welded is located very close to the edge of the article these same potentials accordingly indicate essentially the presence of the beam on one side or the other of the seam. In the description which follows the negative potential which appears on the line 44 when the article is struck by the beam 34 is sometimes referred to for convenience as either an on-article or one-level signal and the zero potential which appears when the beam is off of the article is sometimes referred to as either an off-article signal or zero-level signal.

The method of the invention utilizes the potential difference between the article 19 and the conductive zone, consisting of the electrode 36 in FIG. 6, to control the deflection of the beam in such a manner as to cause it to follow the seam to be welded. More particularly, the method involves the steps of moving the beam 34 in a fundamental manner about or along a given reference, such as a point or a line, so as to have a component of movement parallel to the line to be welded, and then controlling the displacement of the beam from the reference in response to the potential difference existing between the article and the conductive zone. For example, referring to FIG. 3, the beam may be initially directed toward a reference point 48 located on the article 19 and deflected in a fundamental manner so as to rotate about the point 48 at a very small radius and with an angular velocity $\omega$. In response to the existence of a potential difference indicating the presence of the beam on the article, the beam is moved radially outwardly to increase its displacement from the reference point 48 until it moves off of the article to change the potential difference to zero. In response to this latter change the displacement of the beam from the reference point is decreased to move it back toward the article. When the beam again strikes the article the potential difference between the article and the electrode again reverts to its first value and in response to this the displacement of the beam from the reference point is increased and the process repeated. The result of this, obviously, is the production of a sawtooth path of beam movement similar to that shown in FIG. 3, the beam first moving from the point 48 to the point $a$ to the point $b$ to the point $c$, etc. After the beam moves off of the seam, as at point $a$ or $c$, a delay period is initiated during which the on-article signal is inhibited from causing a growth in the displacement of the beam. Preferably, the beam is first directed onto the point 48 in a defocused condition and moved in a minimum radius circular path about the point 48 until the actual welding operation begins. The welding operation is then begun by focusing the beam at a given angular position of the beam during one of its revolutions. Immediately after such focusing and throughout the following revolution of the beam displacement of the beam from the point 48 is increased and decreased as explained above in accordance with changes in the potential difference between the article and the electrode to cause the beam to follow and weld, in a sawtooth stitching motion, the seam 26. After the beam makes one full revolution during such welding movement it is again defocused when it reaches the same angular position at which it began, and the welding operation is then complete.

The space between the individual stitches of the beam path, in FIG. 3, may be varied by controlling the fundamental angular velocity $\omega$ of the beam and by controlling the rate at which the displacement of the beam from the reference point 48 is increased and decreased in response to the on-article and off-article signals. In FIG. 3 the spacing between the individual stitches has been exaggerated for the purpose of illustration, the stitches in an actual welding operation being very close to one another so that the weld produced by each stitch fuses with the weld produced by the preceding and succeeding stitches to produce a completely continuous weld along the entire seam 26. It should also be noted that due to the non-circular shape of the seam 26 the spacing between individual stitches will vary if the fundamental angular velocity $\omega$ of the beam is kept constant. Therefore, the fundamental angular velocity $\omega$ is preferably varied throughout the welding operation in such a manner, and as required, as to maintain the fundamental linear velocity of the beam relative to the seam at a substantially constant value.

In place of having a sawtooth type of stitching motion superimposed on its fundamental motion, the beam may have a secondary circular, or other similar oscillatory movement, superimposed on its fundamental movement. FIG. 4, for example, shows the path of a beam utilizing a secondary circular motion superimposed on the fundamental movement. In this case, the beam is initially directed toward the reference point 48 and moved about such reference point at a fundamental angular velocity $\omega$. At the same time, a secondary circular movement is imparted to the beam at a frequency many times greater than the fundamental frequency $\omega$. The beam is initially defocused and caused to move in a small radius circle about the point 48 prior to the start of the welding operation. At the start of the welding operation the beam is focused at a given point in the fundamental revolution of the beam and thereafter, throughout the following revolution, the radius of the fundamental beam movement is controlled in accordance with variations in the potential difference existing between the article and the adjacent conductive zone or electrode. More particularly, as the beam in FIG. 4 moves off of and on to the article 19, as a result of its rapid secondary motion, the waveform of the potential difference between the article and the electrode will take the form of a series of pulses. That is, after the beam reaches the edge of the article, each secondary revolution of the beam will cause it to be off the article for part of the revolution and on the article for the remainder of the revolution. If the waveform resulting from this is compared to a reference voltage equal to a given average value of the waveform and the result integrated, the output of the integrator will be a voltage proportional to the displacement of the beam required to keep the general or fundamental path of the beam in alignment with the seam 26. Also, similar to the situation with the sawtooth path of FIG. 3, the fundamental angular velocity is preferably varied throughout the welding revolution in FIG. 4 to maintain a relatively constant linear speed of the beam relative to the seam.

Another way in which the beam path may be controlled is shown in FIG. 5. This method may be referred to as piecewise control and may be used for welding along an open line or seam as well as along a closed line or seam. In this method the beam is moved along a straight reference line arranged generally parallel to the line to be welded. In FIG. 5 this fundamental beam movement may be taken to proceed from the left to the right along the X axis from the point $-K$ to the point $+K$, the X axis in this case being the reference line. As the beam moves along the X axis its displacement from such axis is controlled in accordance with the potential difference existing between the article 19 and the adjacent conductive zone or electrode in substantially the same manner as in FIG. 3. When the beam is located off and to the left of the article 19 it is maintained coincident with the X axis. Then when the beam strikes the article 19 the displacement of the beam from the X axis is rapidly increased until the beam again moves off of the article to produce an off-article signal. In response to this off-article signal the beam is moved back toward the X axis to again strike the article and to thereby produce an on-article signal. In response to this on-article signal the displacement of the beam from the reference line is again increased, the process repeating itself to produce a sawtooth stitching motion of the beam along the upper extent of the seam 26 as viewed in FIG. 5. As in the method of FIG. 3, each time the beam moves off of the article a delay period is initiated during which the displacement of the beam from the reference line is decreased despite the appearance of an on-article signal prior to the running of the delay period. If the entire seam 26 of the article 19 is to be welded in accordance with the method illustrated in FIG. 5, the one welding operation illustrated in this figure may be repeated for each of the other three edges of the work piece. Such a procedure is explained in more detail hereinafter in connection with the description of the system shown in FIG. 18.

In reference to FIG. 5, it will be understood that when the article is welded along all of its four sides the welds will overlap at the corners of the article to produce a cross hatch pattern in the corner areas thereby joining the four individual welds and producing an amount of welding at the corners substantially equal to the welding obtained along the four major lengths of the seam. In addition to piecewise welding using a sawtooth path as illustrated in FIG. 5, such welding may also be practiced by superimposing a secondary circular motion on the beam, as in FIG. 4, and utilizing the waveform of the potential difference between the article and the electrode in substantially the same manner as in FIG. 4 to control the displacement of the beam from the reference line as it is moved along such reference line.

Various different means may be used for controlling the beam in accordance with the different methods discussed above, and reference is now made to FIGS. 6, 7 and 8 for the description of a system operable to produce a sawtooth pattern of beam movement along the seam, as shown in FIG. 3. Considering first FIG. 6, this figure shows, in block diagram form, a complete system for automatically controlling the path of the beam 34 in response to the off-article and on-article signals appearing on the conductor 44. To obtain a fundamental circular movement of the beam the system includes a sine function generator for producing two sine function output signals which are 90° out of phase. In the illustrated case this sine function generator comprises a voltage controlled oscillator 52 which produces two sinusoidal voltage signals which appear respectively on the lines 54 and 56. The frequency of the two output signals is determined by the control voltage $e_c$ appearing on the input line 58. If the signal appearing on the output line 54 is therefore represented as $E \cos Ke_c t$, then the voltage signal appearing on the output line 56 is $E \sin Ke_c t$. The signal appearing on the line 54 constitutes an input to a Y multiplier circuit 60, the output of which is connected through a transconductance amplifier 62 to the Y deflection coils 38. Similarly, the signal appearing on the line 56 comprises an input to an X multiplier circuit 64, the output of which is connected through a transconductance amplifier 66 to the X deflection coils 40. The transconductance amplifiers 62 and 66, it will be understood, serve to provide output currents proportional to the input voltages thereto. If electro-static deflection is used in place of magnetic deflection the two transconductance amplifiers 62 and 66 may be replaced by two voltage amplifiers. The two multiplier circuits 60 and 64 are also connected to a common input line 68 on which appears a voltage signal $e_s$. Each multiplier circuit operates to multiply the signal appearing on the input line 54 or 56 by the signal $e_s$ on the line 68. The output of the Y multiplier circuit 60 is therefore equal to $e_s E \cos Ke_c t$ and the output of the X multiplier circuit 64 equal to $e_s E \sin Ke_c t$. If the signal $e_s$ remains at a constant value it will therefore be obvious that the voltage controlled oscillator 52 serve to supply the X and Y deflection coils with two constant amplitude sinusoidal signals 90° out of phase so as to cause the beam 34 to move in a fundamental circular path at a fixed radius from the reference point 48.

The control of the beam to cause it to move in a saw-tooth stitching pattern and to follow the seam 26 while it undergoes its fundamental motion is provided by a secondary control circuit responsive to the on-article and off-article signals appearing on the conductor 44. This circuit includes a signal amplifier 78 connected with the line 44, a delay circuit 80, a NOR gate 82, a diode 84, another signal amplifier 86, and a discharge timing circuit comprising a fixed resistor 88 a variable resistor 90 and a condenser 92.

During a welding operation, an on-article signal first appears on the line 44. This signal in turn produces a negative or one-level signal at the output of the NOR gate 82 and permits a current to flow through the resistors 90 and 88 and diode 84 to charge the capacitor 92 and to provide a maximum input voltage to the amplifier 86. This latter input voltage is amplified by the amplifier 86 to step the voltage $e_s$ on the line 68 to a high value. The high value of the voltage $e_s$ in turn, through the multipliers 60 and 64, produces high values of input voltages to the transconductance amplifiers 62 and 66 to increase the magnitudes of the currents supplied to the X and Y deflection coils and to therepy cause the beam to move rapidly outwardly away from its reference point and toward the edge of the article.

As the beam moves off the article the potential of the article changes to produce an off-article signal on the line 44. This signal, after passing through the signal amplifier 78 produces a one-level signal on the line 79 to trigger the delay 80 and condition the NOR gate 82 to produce a zero-level signal at its output. This latter signal in turn causes the condenser 92 to discharge through the variable resistor 90 to slowly decrease the value of the input voltage to the amplifier 86, thereby slowly decreasing the voltage $e_s$ appearing on the line 68 and slowly decreasing the magnitudes of the signals supplied to the X and Y deflection coils to move the beam toward its reference point and back onto the article 19. When the beam again strikes the article an on-article signal is again produced on the line 44, but this signal is inhibited from terminating the discharge of the condenser 92 until the running of the delay period provided by the delay 80. After the running of the delay period the NOR gate 82 again provides a negative signal at its output terminal to permit charging current to again flow to the condenser 92 and to provide a maximum voltage at the input of the amplifier 86, assuming that the beam 34 is on the article at the end of the delay period. If the beam 34 is not on the article at the end of the delay period the condenser 92 continues to discharge until the beam does move onto the article. By adjusting the variable resistor 90 the rate of discharge of the condenser 92 may be varied to control the amount by which the radial displacement of the beam is decreased during each period of decay. During the period of increasing radial displacement the beam is moved at a very rapid rate as compared to the rate of which it is moved during the decay period and most of the actual welding is performed during such decay period.

The starting and stopping of a welding operation is controlled by a beam control module indicated at 92 in FIG. 6 and shown in more detail in FIG. 7. Referring to FIG. 7 for a description of this module, a start push button 94 is connected between the module 92 and ground and is momentarily closed to start the welding operation on the workpiece. The beam module itself comprises essentially two flip-flops 96 and 98, three AND gates 100, 102 and 104, an OR gate 106, a delay circuit 108, a Schmitt trigger 110, a beam relay 112 and a focus control 114. The beam relay is a part of the electron beam welder and serves to turn on and off the beam 34. The focus control 114 is also a part of the welder and serves to focus and de-focus the beam relative to the workpiece.

Before the start of a welding operation the article is so positioned in the electron beam welder, and/or suitable fixed signals are provided for the X and Y deflection coils, so as to cause the beam to be initially directed toward a point 48 on the article after the push button 94 is closed. When the push button 94 is closed it supplies a pulse, through the condenser 116, to set the flip-flop 96 to produce a one-level signal on the line 118. At this time the $\overline{B}$ output of the flip-flop 98 is at the one-level and conditions the focus control 114 to de-focus the beam. Also, both of the inputs to the OR gate 106 are at the zero-level to produce a zero-level output to the AND gate 104, and accordingly a zero-level output to the beam relay 112, causing the beam to be turned off.

The input to the Schmitt trigger 110 is the X axis sinusoidal voltage appearing on the line 56 in FIG. 6. When this signal reaches a given value during its cycle, corresponding to a given angular position of the beam in its fundamental circular motion, the trigger is actuated and through the condenser 120 applies a negative pulse to the AND gate 100. The AND gate 100 is at this time held in an open condition by the one-level signal on the line 118 so that the pulse produced by the trigger is applied to the complement terminal of the flip-flop 98 to change the signal at the $\overline{B}$ terminal from a one-level signal to a zero-level signal and to change a signal at the B terminal from a zero-level signal to a one-level signal. The zero-level signal from the B terminal of the flip-flop 98 passes through the OR gate 106 and AND gate 104 and conditions the beam relay 112 to turn on the beam 34. At the same time the zero-level signal at the $\overline{B}$ terminal of the flip-flop 98 conditions the focus control 114 to focus the beam and initiate welding.

After the beam thereafter completes one revolution of its fundamental motion the signal appearing on the line 56 again reaches such a value as to operate the Schmitt trigger 110. This again applies a negative pulse to the complement gate of the flip-flop 98 and reverses the signals appearing at the B and $\overline{B}$ terminals. The negative pulse which is applied to the complement terminal of the flip-flop 98 is also applied to the delay circuit 108 and initiates a delay period during which a one-level signal appears at the D terminal and a zero-level signal appears at the $\overline{D}$ terminal. The one-level signal on the D terminal passes through the OR gate 106 and through the AND gate 104 to the beam relay 112 to hold on the beam until the delay period is run. At the termination of the delay period the delay 108 returns to its normal state in which a one-level signal appears at the $\overline{D}$ terminal and a zero-level signal at the D terminal. Two zero-level signals are therefore applied to the OR gate 106 which applies a zero-level signal to the AND gate 104 to condition the beam relay 112 to turn off the beam. Also after the running of the delay period, the appearance of the one-level signal at the $\overline{D}$ terminal, together with the one-level signal at the $\overline{B}$ terminal of the flip-flop 98, produces a one-level output from the AND gate 102 which, through the condenser 122, supplies a pulse to the reset terminal of the flip-flop 96 to reset the latter to its initial condition in preparation for a new welding operation. Before leaving the beam control module, it should be noted that when the focus control 114 is operated to change the beam from a de-focused to a focused condition some small amount of time is required to effect the focusing, and likewise when the control is operated to change the beam from a focused to a de-focused condition a similar amount of time is required. The delay period provided by the delay circuit 108 allows the beam to continue operation for a short time following the initiation of the de-focusing step to compensate for the slight amount of welding which may not have taken place at the beginning of the welding revolution due to the time required for focusing the beam.

As mentioned previously, if the beam is moved along the seam 26 of the workpiece with a constant fundamental angular velocity $\omega$ the linear speed of the beam relative to the seam will vary so that at different parts of the seam the stitches of the seam path will be spaced different distances from each other. Means are therefore preferably provided for varying the fundamental angular velocity of the beam to produce a constant linear speed of the beam relative to the seam. In the system of FIG. 6 the means for so varying the fundamental angular velocity of the beam comprises a low band pass filter 124 associated with the Y deflection coils 38, and another low band pass filter 126 associated with the X deflection coils 40. It also includes an analog computing circuit 128, another analog computer circuit 130 and a reference voltage circuit 132. This means utilizes the fact that the instantaneous values of the X and Y deflection of the beam are represented by the magnitudes of the currents in the deflection coils. The Y deflection coils are connected to ground through a resistor 134, and an input to the low band pass filter 124 is connected between the Y deflection coils and the resistor 134 so that the voltage supplied to the filter 124 is directly proportional to the current flowing through the Y deflection coils. Similarly the X deflection coils are connected to ground through a resistor 136 and the input to the low band pass filter 126 is connected between the X deflection coils and the resistor 136 so that the voltage signal supplied thereto is proportional to the current through the X deflection coils. The filters 124 and 126 remove the high frequency components of the respective input signals caused by the stitching movement of the beam, the outputs of the filters therefore being representative of the basic displacement of the beam. The analog computer computes the function $(de_y)^2 + (de_x)^2$ and produces an output voltage signal $e_1$ proportionally related to $(ds)^2$, where $ds$ is the linear speed of the beam along the seam. The reference voltage circuit 132 provides an output voltage $e_2$ which is proportionally related to the square of the desired linear speed of the beam. The analog computer circuit 130 then compares the voltage $e_1$ with the voltage $e_2$ and integrates the result to produce the voltage output signal $e_c$ used to control the output frequency of the voltage controlled oscillator 52. From this it will be seen that any departure of the actual speed of the beam relative to the seam from the desired speed, as established by the reference circuit 132, will change the input voltage $e_c$ to the voltage controlled oscillator to change the fundamental angular velocity of the beam in such a direction as to return the linear speed of the beam to the desired value.

Figure 8:
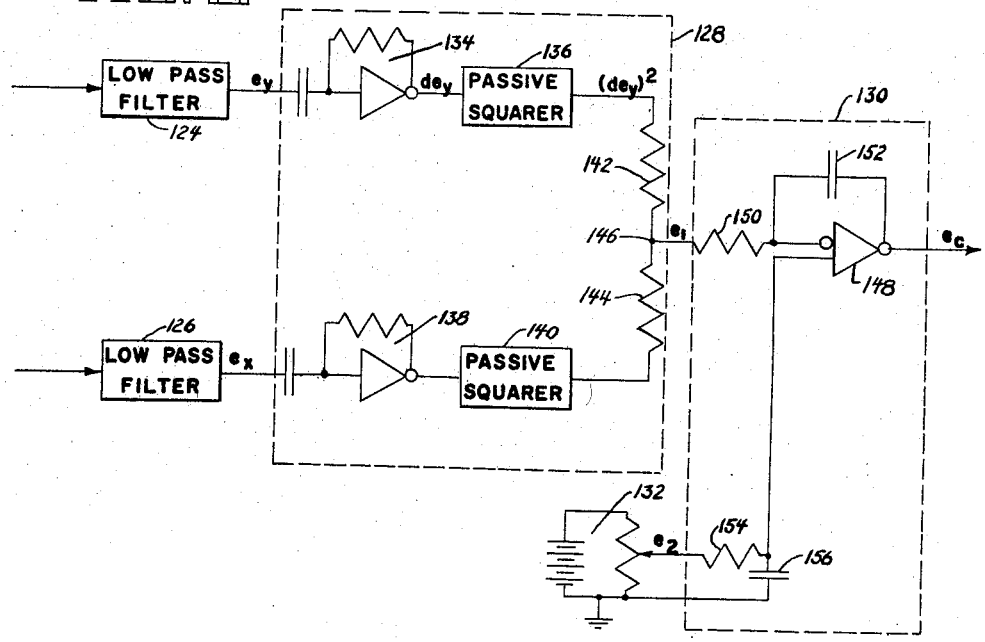
FIG. 8 is a schematic diagram illustrating an exemplary circuit for the analog computers of the FIG. 6 control system.

The circuits for the analog computers 128 and 130 may take various different forms, and reference is now made to FIG. 8 which shows exemplary circuits that may be used for such computers. In FIG. 8, the analog computer 128 includes, for the Y axis, an operational differentiator 134 which differentiates the $e_y$ signal from the low band pass filter 124 to produce a differentiated signal $de_y$. The $de_y$ signal in turn constitutes the input to a passive squaring circuit 136 which produces a signal related to $(de_y)^2$. Similarly, the computer 128, for the X axis, includes a differentiator 138 and passive squarer 140 which respectively differentiate and square the input signals thereto to provide at the output of the passive squarer a signal related to $(de_x)^2$. The output signals of the passive squarers 136 and 140 are summed through the resistors 142 and 144 to produce a voltage at the summing point 146 related to $(de_y)^2 + (de_x)^2$. The analog computer 130 comprises an operational integrator including an operational amplifier 148 having two inputs thereto, one for the $e_1$ signal and one for the $e_2$ reference signal. The operational amplifier 148, the resistor 150 and the condenser 152 comprise the integrating circuit for the $e_1$ signal, and the amplifier 148, the resistor 154 and condenser 156 comprise the integrating circuit for the $e_2$ signal. The output $e_c$ of the computer 130 is therefore related, as desired, to the integral of $(e_1 - e_2)$.

FIG. 9 shows partially a beam path with control system comprising another embodiment of the invention and which is identical with the system shown in FIG. 6 except for utilizing a different control circuit for producing a sawtooth or stitching movement of the beam in response to the on-article and off-article signals appearing on the line 44. FIG. 9 shows only the logic or secondary control circuit provided for varying the input voltage $e_s$ to the multipliers in response to the on-article and off-article signals, and the remainder of the FIG. 9 system may be taken to be the same as that shown in FIG. 6. In the FIG. 6 system the discharge timing circuit of the FIG. 6 system is eliminated and instead the time constant of the deflection coils and their associated resistances 134 and 136 are utilized to control the rate of growth and decay of the beam relative to its reference point. The line 44 on which the on-article and off-article signals appear is connected to a Schmitt trigger 158 the output of which is directly connected to a NOR gate 160 by the line 162 and also connected to the same NOR gate through a delay 164.

In the operation of the FIG. 9 system assume first that the electron beam 34 is directed onto the article 19 so as to produce a negative or on-article signal at the line 44. This tribbers the Schmitt trigger 158 and produces a zero-level signal on the line 162. At the same time the delay 164, through its $\overline{D}$ terminal, also supplies a zero-level input to the NOR gate to produce a one-level output therefrom. This latter one-level signal passes through the amplifier 86 to step the output voltage $e_s$ to a high value and to thereby produce outputs from the multipliers which increase the signals to the deflection coils to move the beam outwardly toward the edge of the article 19, the rate of beam movement being determined by the time constant of the deflection coils. After the beam 34 moves off the article an off-article signal is produced on the line 44 which returns the Schmitt trigger 158 to its off condition and thereby produces a one-level signal on the line 162. This latter signal triggers the delay 164 and also produces a zero-level signal from the NOR gate, thereby supplying a zero signal to the amplifier 86 to make the $e_s$ signal equal to zero. This in turn causes the output of the multiplying circuits 60 and 64 to be returned toward zero to cause the beam displacement to decay and return the beam toward its reference point. After the running of the delay period provided by the delay 164 a zero-level signal is applied to the NOR gate 160 from the $\overline{D}$ terminal of the delay to again produce a one-level signal from the NOR gate, provided the beam is on the article so as to actuate the Schmitt trigger at the end of the delay period, to move the beam outwardly toward the edge of the article to begin another cycle.

FIG. 10 shows a beam path control system which also produces a sawtooth stitching motion of the beam as it moves along the seam to be welded. This system is generally similar to that of FIG. 6 except for including a different secondary control means for varying the voltage $e_s$ to the multipliers in response to the on-article and off-article signals appearing on the line 44. The secondary control circuit in FIG. 10 is in turn quite similar to that described in FIG. 9 and, as in FIG. 9, relies on the time constant of the X and Y deflection coils to control the growth and decay of the displacement of the beam from its reference point. This circuit includes a Schmitt trigger 158 similar to that of FIG. 9, a delay 166, an AND gate 168, an OR gate 172 and a reference voltage circuit 174 for providing a reference voltage used to establish a minimum size of circle traversed by the beam 34 while undergoing its fundamental circular motion. Except for the secondary control means, the system of FIG. 10 is similar to that shown in FIG. 6 and need not be redescribed.

Referring to FIG. 10 for an understanding of the operation of the system there shown, when the beam 34 strikes the article 19 it produces an on-article signal on the line 44 which triggers the Schmitt trigger 158 to produce a zero-level signal on the line 176. This closes the AND gate 168 and causes it to provide the OR gate 172 with a zero-level signal. The OR gate 172 is, however, also supplied with a one-level signal from the D terminal of the delay 166 with the result that a one-level signal is supplied to the X and Y multipliers 60 and 64 to cause the beam 34 to be moved away from its reference point toward the edge of the workpiece. As the beam 34 leaves the workpiece the signal on the line 44 becomes zero and returns the Schmitt trigger 158 to its original condition, thereby providing a one-level signal on the line 176. This triggers the delay 166 and causes the AND gate 168 to be opened to transmit therethrough the reference voltage supplied by the reference voltage circuit 174. A zero-level signal from the D output of the delay 166 is at this time supplied to the OR gate 172 together with the voltage from the reference circuit 174, with the result that the reference voltage is produced at the output of the OR gate 172. This reference voltage is of considerably less magnitude than the one-level voltage signal and is sufficiently small to cause the beam to be moved back onto the workpiece 19. The reference voltage, however, limits the amount by which the displacement of the beam may be decreased and therefore establishes a minimum circle into which the beam is prevented from moving. As the beam again strikes the workpiece it again turns on the Schmitt trigger 158 and initiates a new outward beam movement after the running of the delay period.

FIG. 11 shows a beam path control system which operates to cause the beam to have superimposed thereon a secondary circular motion while moving along the length of the seam to be welded. In this system the means for producing the fundamental circular motion of the beam and the means for causing the beam to move at a constant linear speed relative to the seam are similar to those described in connection with FIG. 6 and need not be redescribed. Referring to FIG. 11, the system there illustrated includes a second sine function or circle generator 180 having two outputs connected respectively to the lines 182 and 184. The circle generator 180 is operable to provide signals on these two lines which vary sinusoidally and which are 90° out of phase. The signal appearing on the line 182 is transmitted to the Y axis transconductance amplifier 62 and is combined by said amplifier with the signal from the Y multiplier 60, thereby producing a signal for the Y axis deflection coils comprised of the signal from the Y multiplier having superimposed thereon, or modulated by, the signal from the circle generator 180, the signal from the circle generator 180 being of a frequency many times greater than that from the Y multiplier 60. Similarly, the signal appearing on the line 184 is transmitted to the X axis transconductance amplifier 66 where it is combined with the output signal from the X multiplier 64 to produce a signal for the X axis deflection coils comprised of the X multiplier signal having superimposed thereon, or modulated by, the higher frequency signal from the circle generator 180. As a result of the combined signals from the X and Y multipliers and the circle generator 180, the beam is therefore moved in a fundamental circular path and at the same time has superimposed thereon a secondary circular motion having a frequency many times greater than that of the fundamental frequency.

The secondary control means in FIG. 11 for varying the voltage appearing on the line 68 in accordance with the on-article and off-article signals appearing on the line 44, to in turn control the displacement of the beam from its reference point, includes an integrator comprised of an operational amplifier 186, a condenser 188 and a resistor 190. Also included in the control means is a reference voltage circuit 192, another reference voltage circuit 194 and an AND gate 196. The integrator 184 operates to compare the wave form appearing on the line 44 with the reference voltage produced by the reference voltage circuit 192 and to integrate the result of the comparison. This integrated result is transmitted to the AND gate 194 which also has as an input thereto the reference voltage provided by the second reference voltage circuit 194. This latter reference voltage is used to establish a minimum radius circle along which the beam is capable of moving. The AND gate 196 operates to transmit to the line 68 the larger of the two signals applied to its two input terminals. Therefore, when the signal supplied by the integrator 184 is less than the signal supplied by the reference voltage circuit 194 the reference voltage is supplied to the line 68 to cause the beam to move in its minimum radius circular path. It will also be apparent that, as the average value of the wave form appearing on the line 44 is compared with the reference voltage supplied by the reference source 192, departures of the average value from the reference voltage are integrated by the integrator 184 and will change the voltage $e_s$ appearing on the line 68 in such a manner as to cause the beam to follow the line to be welded, assuming that the output voltage of the integrator is greater than the reference voltage supplied by the circuit 196.

It is important to note that in all of the beam path control systems hereinbefore described the act of turning the electron beam onto the article to be welded starts the system into operation, and in order for the system to properly operate the edges of the article must lie within the maximum and minimum limits of the beam displacement. This is shown, for example, in FIG. 12 wherein the circle 198 indicates the minimum limit of the beam displacement and the circle 199 indicates the maximum limit of the beam displacement. If there are some areas on the face of the object which should not be touched by the beam, maximum and minimum limits can be set on the X and Y deflections of the beam to positively assure that the beam does not wander into these areas. This limiting can be obtained either by the use of electrical circuits, such as the reference voltage circuit 194 of FIG. 11 for establishing a minimum limit, or by a shadow mask placed over the object and properly biased. FIGS. 13 and 14 show by way of example two additional circuits which may be used for electrical limiting. FIG. 13 shows the circuit associated with the X deflection coils and it will be understood that a similar circuit is associated with the Y deflection coils. In FIG. 13 the electrical limits are set by a set of two diodes 206 and 208 and two Zener diodes 202 and 204 connected in the manner shown with the input terminal 200 of the associated deflection coils. That is, the diode 206 and Zener diode 204 are connected in series with each other between the terminal 200 and a source of voltage +B, and the other diode 208 and Zener diode 202 are connected in series between the terminal 200 and ground. From FIG. 13 it will therefore be understood that the voltage signal supplied to the transconductance amplifier 66 associated with the X deflection coils is prevented from rising above or falling below the maximum and minimum voltage levels determined by the breakdown voltage Z of the Zener diodes 202 and 204 and by the value of the voltage +B.

In the circuit of FIG. 14 the limits of the beam deflection are established for each axis by a logic-plus-level AND gate 210 and a logic-plus-level OR gate 212. The AND gate 210 has as inputs thereto the output from the associated multiplier 64 and the output from an associated circuit (not shown) providing a reference voltage representing a maximum value of the X deflection. The AND gate 210 operates to transmit to its output line 214 the smaller of the two values of the two inputs. The OR gate 212 has inputs thereto the signal appearing on the line 214 and a signal provided by an associated reference voltage source (not shown) providing a reference voltage representative of the minimum X deflection. The OR gate 212 in turn serves to transmit to the associated transconductance amplifier 66 the larger of the two inputs thereto, the result being that the maximum value of the voltage signals supplied to the transconductance amplifier 66 is limited to the value of the reference voltage appearing on the line 213 and the minimum value of the signals supplied thereto is limited to the value of the reference voltage appearing on the line 211. Although FIG. 14 shows only the circuit for the X axis it will be understood that a similar circuit is also provided for the Y axis.

If the maximum limits of the beam deflection are so set that the beam is normally on the object when the maximum deflection is reached, or if the minimum limits are so set that the beam is normally off the object when the minimum limit is reached, then proper operation of the system requires that some means be provided for simulating an on-article or off-article signal when a limit is reached. In most cases, the beam does not reach its minimum deflection except at the start or finish of the operation and therefore only maximum limits need be considered. As the beam reaches the maximum limit of its displacement, if it is not at this time located off of the article an off-article signal must be simulated in order to obtain the desired stitching beam movement. This can be accomplished by using the limit signals to automatically eliminate the on-article signal if the beam reaches such limits. An exemplary system for accomplishing this is illustrated in FIG. 15.

Referring to FIG. 15, the system there shown comprises three AND gates 216, 218 and 220 and two amplifiers 224 and 226. The AND gate 216 is a logic-plus-level gate and serves to limit the maximum value of a signal supplied to the X axis transconductance amplifier 66 to the value of the signal appearing on the line 213. The AND gate 218 is likewise a logic-plus-level gate and serves to limit the value of the signal supplied to the Y axis transconductance amplifier 62 to the value of the signal appearing on the associated input line 215. The normal deflection signal appearing on the line 228 is compared with the $X_{max}$ signal appearing on the line 213 by the amplifier 224 to produce a one-level signal in the line 230 when the signal is not greater than the $X_{max}$ signal. Similarly, for the Y axis, the Y signal appearing on the line 232 is compared with the $Y_{max}$ signal appearing on the line 215 by the amplifier 226 to produce a one-level signal on the line 234 when the Y signal is not greater than the $Y_{max}$ signal. The two lines 230 and 234 are inputs to the AND gate 220, the latter AND gate 220 also having as an input thereto the signal appearing on the line 44. Therefore, it will be seen from FIG. 15 that a negative or on-article signal is produced at the output of the AND gate 220, on the line 236, when the beam is on the article and when neither the maximum X nor the maximum Y limit of the beam displacement is reached at the same time. When either one of the maximum X or maximum Y limits is reached, the AND gate 220 is closed to remove the on-article signal from the line 236, and to replace it with a zero-level signal equivalent to an off-article signal, it being understood that the signal appearing on the line 236 is used in place of the signal appearing on the line 44 to operate the associated secondary beam control means.

As suggested hereinbefore, a shadow mask may also be used to prevent the beam from wandering into undesired areas of the workpiece. For example, FIG. 16 shows an article 19a having a lateral protrusion 238 and a central area 240 both of which should not be struck by the beam 34. To prevent the central area 240 from being struck by the beam 34, a shadow mask 242 is positioned above the area 240, that is in front of the area 240 relative to the direction of the beam, and is electrically connected with the article through a conductor 244. Therefore, when the beam strikes the mask 242 the current of the beam flows through the article and through the resistance 46 to the electrode 36 so as not to change the electrical potential between the article and the electrode and therefore not causing a switching of the control circuit connected with the line 44. The protrusion 238 is protected by another shadow mask 246 located thereabove and connected by a conductor 248 to the electrode 36. In this case it is assumed that the article is to be welded along the edge 250 located above the protrusion 238. Therefore, when the beam 34 moves to the left beyond the edge 250 it strikes the mask 246 and the current of the beam flows directly to the electrode 36 through the conductor 248 to reduce to zero the electrical potential between the article 19a and the electrode, thereby producing the equivalent of an off-article signal on the line 44 and, by operation of the associated secondary control system, returning the beam toward the center of the article.

In considering the shadow mask 246 it will be noted that this mask not only protects the lateral protrusion 238 of the article 19a but also causes the electron beam 34 to follow along the edge 250 of the mask, since off-article and on-article signals are produced as the beam crosses from one side to the other of the mask edge. More particularly, the mask 246 provides an electrically conductive zone connected with the article 19a through the resistance 46 so that when the beam strikes the article one electrical potential exists between the article and the mask, and when the beam strikes the mask another electrical potential exists between the article and the mask. From this it will, therefore, be obvious that masks or similar conductive zone providing means may be used to cause the beam 34 to follow a line located quite some distance from the edge of the article. An arrangement using this principle is shown in FIG. 17 wherein the article 19b to be welded includes a weld line 252 spaced a considerable distance laterally inwardly from the associated edge 254 of the article, the seam 252 being located too far from the edge 254 to allow the movement of the beam from one side to the other of the edge 254 to be used to cause the beam to follow the seam 252. Therefore, to obtain proper control of the beam, a mask 256 is positioned above the article 19b and connected to the electrode 36 through a conductor 258. The mask 256 has an opening 260 therein, the edges of which conform substantially to the size and shape of the seam 252. These mask edges are so located that their projections in the direction of the beam coincide substantially with the seam 252.

At the start of the welding operation in FIG. 17, the beam is first directed through the opening 260 of the mask onto the article 19b to produce a signal on the line 44 utilized by the associated beam control system to move the beam radially outwardly toward the mask 256. As the beam strikes the mask a different signal is provided on the line 44 and thereafter the path of the beam is controlled as previously described to move it in a sawtooth stitching motion from one side to the other of the mask edge. Since the projection of the mask edge coincides with the seam to be welded the beam in following along the mask edge also follows along the seam.

It should also be noted that a mask such as shown at 246 in FIG. 16 or at 256 in FIG. 17 may also be used to weld or cut an article made of a non-conductive material by connecting the mask to ground through a resistor, by connecting the line 44 to the mask, and by modifying the logic to remove the inverter preceeding the line 68, as in the system of FIG. 6 for example. Such a modified system is shown in FIG. 18 wherein the mask is shown at 257 and the non-conductive article at 196. The logic between the line 44 and the line 68 consists merely of a NOR gate 259 and a time delay 261 connected as shown. In this modified circuit the beam 34 starts at a maximum radius and moves inwardly until the edge of the mask 257 is reached. It then proceeds farther inwardly during the delay period and at the end of the delay period moves back out to the mask, and a new cycle is started. This same modified system may also be used to advantage when working on a very large conductive article. In the case of such articles the charge given to the article by the beam tends to leak off relatively slowly when the beam is removed from the article and therefore may cause some errors when using the previously described system of FIG. 6, for example. Such errors are avoided by the FIG. 18 system as the charge imposed on the mask leaks rapidly therefrom.

It should also be noted that in all systems using masks the beam is focused onto the article and therefore when striking the mask is slightly defocused relative to the mask due to the spacing between the article and the mask, the amount of defocusing depending on the size of such spacing. Therefore, the beam does not have the same penetrating or cutting effect on the mask as on the article.

In addition to moving the beam in a fundamental circular manner about a reference point it may also be moved in a fundamental linear manner along a given reference line as in FIG. 5. FIG. 19 showns a control system for so controlling the movement of the beam, and in this system the beam is further automatically moved in sequence through four straight line fundamental movements throughout each of which a respective edge of a four-sided article is welded. Turing to FIG.19, the system there shown is comprised of logic units and other circuit components arranged and connected as illustrated. For convenience and clarity a number of connections have been eliminated and replaced by terminals represented by the numerals 1, 2, 3 and 4 enclosed in small circles. In an actual system all of the terminals bearing the number 1 are connected to each other, all of the terminals bearing the number 2 are connected to each other, and so forth.

The FIG. 19 system is started by pushing the start push button 262. This resets all of the three flip-flops 264, 266 and 268 to put one-level signals on the lines 270, 272 and 274 thereby turning on the beam through the line 350 and causing the AND gate 276 to conduct. This in turn turns on the AND gate 278 and allows the latter gate to supply to the OR gate 280 a reference voltage K appearing on the line 282 and supplied by a suitable reference voltage source. The voltage supplied on the line 282 is referred to as the X axis offset voltage and when applied to the X axis coils produces a displacement K of the beam from the Y axis. This X axis offset voltage passes through the OR gate 280, the amplifier 284 and energizes the X axis coil to displace the beam a distance K from the Y axis in the negative direction. At this time, the NOR gate 286 has two zero-level inputs thereto and, accordingly, applies a one-level signal to the line 288 and to the AND gates 290 and 296. The —K displacement of the beam is sufficiently great to move the beam off of the article 19, as shown in FIG. 5. Therefore, an off-object or zero-level signal is produced on the line 44 and transmitted to the AND gate 296 with the result that the latter gate is opened to allow a reference voltage 100 $V_s$ to be transmitted to the OR gate 292 and through the latter OR gate to a ramp voltage generator 294. Therefore, as long as the beam if off the article 19 the ramp voltage generator 294 has an input voltage 100 $V_s$ applied thereto to apply a steep ramp voltage to the line 298 which, through the AND gates 300 and 302, is applied to the amplifier 284 and X axis coils to move the beam rapidly toward the right in FIG. 5. When the beam strikes the article 19 the AND gate 296 is closed by the zero-level signal appearing on the line 44 and the reference voltage $V_s$, instead of the reference voltage 100 $V_s$, is applied to the ramp voltage generator 294 through the AND gate 290, the voltage $V_s$ being of a value equal to approximately one one-hundredth of the value of the voltage 100 $V_s$. Accordingly, the beam 34 is thereafter moved at a much slower rate along the X axis until it again leaves the article, after which the AND gate 296 is again opened to cause the beam to be moved at a more rapid rate by the application of the reference voltage 100 $V_s$ to the ramp voltage generator 294.

During the slow movement of the beam from the left-hand edge to the right-hand edge of the article in the FIG. 5, its displacement from the X axis is controlled in the manner hereinbefore described by the on-article and off-article signals appearing on the line 44 to cause it to move in a sawtooth stitching pattern along the upper edge of the article as viewed in FIG. 5. In the system of FIG. 19, the means for so controlling the beam comprises an amplifier 304, a delay circuit 306 and a NOR gate 308. When the beam is off of the article, a zero-level signal is produced on the line 44 which produces a one-level signal at the output from the amplifier 304. This one-level signal in turn causes the output from the NOR gate 308 to be at the zero-level and to apply a zero-level signal to the input of the AND gate 310 which latter gate is held open by the one-level signal applied to its other input by the AND gate 276. The output of the AND gate 310 is connected with the OR gate 312 and, through the OR gate 312 and associated amplifier 314, applies a zero signal to the X axis coils so that the beam, until it strikes the article 19 moves along a line coinciding with the X axis.

When the beam does strike the article a one-level signal is produced on the line 44 which produces a zero-level signal at the output of the amplifier 304 and a one-level signal from the output of the NOR gate 308. The latter one-level signal is transmitted to the amplifier 314 through the AND gate 310 and OR gate 312 to apply a signal to the X axis coils displacing the beam in the plus Y direction from the X axis, the rate of the beam movement in the Y direction being controlled by the time constant of the Y axis coils. Thereafter, when the beam moves off of the upper edge of the article a zero-level signal is produced on the line 44 which produces a one-level signal at the output of the amplifier 304 and triggers the delay 306 to produce a zero-level signal at its output, thereby transmitting a zero-level signal to the X axis coils to return the beam toward the X axis. After the beam returns to the article it continues to move toward the X axis until the running of the delay period provided by the delay 306, after which it is again moved away from the X axis in the plus direction, and this process is repeated as the beam moves throughout the entire length of the upper edge of the article to produce a sawtooth stitching path.

As mentioned, after the beam leaves the right-hand side of the article in FIG. 5 it is again moved rapidly toward the right-hand limit of its movement. The ramp voltage appearing on the line 298 is transmitted to a comparing amplifier 316 and is there compared with the X axis offset voltage which is supplied to the amplifier 316 through the AND gate 278 and the OR gate 318. When the ramp voltage on the line 298 becomes greater than the X axis offset voltage the amplifier 316 supplies a signal to the line 320 which, through the diode 322 and AND gate 324, supplies a signal to the complement terminal of the flip-flop 264 to change the states of its two outputs. The switching of the flip-flop 264 closes the AND gate 276 and turns on the AND gate 326. This in turn turns on the AND gate 328 to supply a Y axis offset voltage C to the Y axis coils, through the OR gate 312 and amplifier 314, to displace the beam by the distance C in the positive direction from the X axis. The ramp voltage generator 294 thereafter supplies a ramp voltage to the Y axis coils through the AND gate 330 and OR gate 332 to move the beam downwardly, as viewed in FIG. 5. The beam, in the same manner as discussed above, is first moved rapidly along the Y axis until striking the object, is then moved slowly along the right-hand edge of the article in a sawtooth stitching pattern, and is then again moved rapidly to the maximum limit of its movement. During the slow portion of the movement welding takes place along the right-hand edge of the article with the signals on the line 309 passing through the AND gate 349 and OR gate 280 to the X axis amplifier 284. When the maximum limit of movement is reached, the amplifier 316 again operates to supply a signal to the line 320 which again supplies a signal to the complement termnial of the flip-flop 264 to change the state of its outputs, this latter change of state producing a one-level signal on the line 334 and energizing the complement terminal of the flip-flop 266 to also cause the flip-flop 266 to change the state of its outputs.

The flip-flops are, accordingly, at this time in such a state as to apply one-level signals to the lines 334, 335 and 274 to turn on the AND gate 336, which in turn turns on the AND gate 338 and supplies the X axis offset voltage to the OR gate 302 which, through the amplifier 284, energizes the X axis coils to displace the beam a distance K from the Y axis in the positive direction. Thereafter, the ramp voltage appearing on the line 298 and passing through the AND gate 340, OR gate 280 and amplifier 284 moves the beam along the X axis from the point +K to the point —K in FIG. 5, the beam again being moved rapidly until it strikes the article, then slowly along the lower edge of the article with a stitching motion until arriving at the lefthand edge of the article, and then rapidly to the point —K. During the slow portion of the movement welding takes place along the lower edge of the article with the signals on the line 309 passing through the AND gate 311 and OR gate 332 to the Y axis amplifier 314. When the beam reaches —K point the amplifier 316 again sends a signal to the complement terminal of the flip-flop 264 which changes the state of the flip-flop 264 and turns on the AND gate 342, this in turn turning on the AND gate 344 and transmititng the Y axis offset signal through the AND gate 344 and OR gate 332 to the amplifier 314 to move the beam along the Y axis to the —C point in FIG. 5. Thereafter, the ramp voltage appearing on the line 298 and passing through the AND gate 346, OR gate 312 and amplifier 314 moves the beam upwardly, in FIG. 5, toward the +C point with the beam again being controlled by the signals appearing on the line 44 to first move rapidly until striking the article, to then move slowly in a stitching motion along the left-hand edge of the article, and to then move in a rapid motion to the +C point. During the stitching motion the AND gate 348 is open to transmit the signals from the line 309 to the X axis coils through the OR gate 302 and amplifier 284. When the beam reaches the +C point the amplifier 316 again sends another signal to the complement terminal of the flip-flop 264. This in turn changes the states of all three flip-flops 264, 266 and 268 which produces a zero-level signal on the line 350 to turn off the beam and to close the AND gate 324. A one-level signal is also produced on the line 352 which produces a zero-level signal on the line 288 and closes and AND gates 290 and 296. The welding process may also be stopped at any time by pressing the stop button 354 which transmits a set signal to the flop-flop 268 and reset signals to the flip-flops 264 and 266 to set the flip-flops in the same conditions as at the normal end of a welding operation.

The invention claimed is:
1. A beam path control means for causing a beam of electrically charged particles to follow with a stitching motion a line on an article positioned in the field over which said beam is movable, said path control means being adapted for use with a beam generator having a first means for deflecting said beam along one axis of said field in response to a first deflection signal and a second means for deflecting said beam along a second axis in response to a second deflection signal, said path control means being further adapted for use with an article such as aforesaid combined with means providing an electrically conductive zone positioned adjacent one side of said line which zone is electrically connected with said article through an electrical resistance so that the potential difference between said zone and said article is one value when said beam is on one side of said line and is of a different value when said beam is on the other side of said line, said beam path control means comprising a sine function generator for producing first and second sine function signals 90° out of phase, a first multiplier circuit connected between said sine function generator and said first deflection means and having said first sine function signal as one input thereto, a second multiplier circuit connected between said sine function generator and said second deflection means and having said second sine function signal as one input thereto, each of said multiplier circuits being operable to provide a deflection signal for the associated deflection means which deflection signal is equal to the associated sine function signal multiplied by a factor dependent on the value of a second input signal, and means for producing such a second input signal for both of said multiplier circuits, said latter means including a first means for rapidly changing the value of said second input signal in response to a value of said potential with the output signal from said first multiplier circuit to produce a first deflection signal applied to said first deflection means, means for combining said fourth sine function signal with the output signal from said second multiplier circuit to produce a second deflection signal applied to said second deflection means, means providing a reference voltage having a value intermediate said first and second potential differences, and means for comparing the potential differences, and means for comparing the potential difference existing between said article and said electrically conductive zone with a reference voltage and for integrating the result of such comparison to produce a resultant voltage used as said second input signal to said two multiplier circuits.

2. A beam path control means as defined in claim 1 further characterized by means for varying the angular velocity of the sine function signals produced by said sine function generator to cause said beam to travel along said line at a substantially constant linear velocity, said latter means comprising a differentiating and squaring circuit associated with each of said first and second deflection means, each of said differentiating and squaring circuits having as an input thereto the deflection signal applied to the associated deflection means and being operable to differentiate and square the low frequency components of such deflection signal to produce an output signal related to the square of the fundamental rate of change of the associated deflection signal, means providing a reference signal related to the square of the desired linear speed of said beam along said line, means for comparing said reference signal to the sum of said signals from said two differentiating and squaring circuits and for integrating the signal resulting from the comparison to produce a frequency determining signal and means for varying the output frequency of said sine function generator in accordance with the value of said frequency determining signal.

3. A beam path control means for causing a beam of electrically charged particles to follow with a stitching motion in line on an article positioned in the field over which said beam is movable, said path control means being adapted for use with a beam generator having a first means for deflecting said beam along one axis of said field in response to a first deflection signal axis and a second means for deflecting said beam along a second axis generally perpendicular to said one axis in response to a second deflection signal, said path control means being further adapted for use with an article such as aforesaid combined with means providing an electrically conductive zone positioned adjacent one side of said line which zone is electrically connected with said article through an electrical resistance so that the potential difference between said zone and said article is one value when said beam is on one side of said line and is of different value when said beam is on the other side of said line, said path control means comprising a first sine function generator for producing first and second sine function signals 90° out of phase, a first multiplier circuit associated with said first deflection means and having said first deflection signal as an input thereto, a second multiplier circuit associated with said second deflection means and having said second deflection signal as an input thereto, each of said multiplier circuits being operable to produce an output signal having a value equal to the value of the associated deflection signal multiplied by a factor dependent on the value of a second input signal, a second sine function generator for producing third and fourth sine function signals which are 90° out of phase and having a frequency many times greater than the frequency of said first and second sine function signals, means combining said third sine function signal.

4. A beam path control means as defined in claim 3 further characterized by means for varying the angular velocity of the sine function signals produced by said first sine function generator to cause said beam to travel along said line at a substantially constant linear velocity, said latter means comprising a differentiating and squaring circuit associated with each of said first and second deflection means and each of which differentiating and squaring circuits has an input thereto the deflection signal applied to the associated deflection means, each of said differentiating and squaring circuit being operable to differentiate and square the low frequency components of the associated input signal to produce an output signal related to the square of the fundamental rate of change of the associated deflection signal, means providing a reference signal related to the square of the desired linear speed of said beam along said line, means for comparing said reference signal to the sum of said signals from said two differentiating and squaring circuits and for integrating the signal resulting from the comparison to produce a frequency determining signal, and means for varying the output frequency of said first sine function generator in accordance with the value of said frequency determining signal.

5. The method of controlling the movement of a beam of electrically charged particles, said method comprising the steps of producing a beam of electrically charged particles directed generally in the direction of a given axis and deflectable relative thereto so as to have a field of movement in a plane perpendicular to said axis, positioning an article so that a given line thereon is within said field of movement, providing an electrically conductive zone adjacent one side of said given line which zone is electrically connected with said article through an electrical resistance so that a substantially different potential difference is produced between said article and said zone when said zone is struck by said beam than when said article is struct by said beam, the value of said potential difference therefore indicating the side of said line on which said beam is located, and controlling the deflection of said beam relative to said given axis to provide movement thereof within said field of movement in response to said potential difference, said line on said article being a closed line, and said step of controlling the deflection of said beam relative to said given axis in response to the potential difference existing between said article and said electrical comprising the substeps of directing said beam in a defocused condition toward a point located within the area enclosed by said line, deflecting said beam to cause it to move in a minimum radius circular path about said point and located entirely within the area enclosed by said line, focusing said beam at a given angular position of said beam during one of its revolutions, immediately after said focusing and throughout the following revolution of said beam increasing and decreasing the radius of the path of said beam in response to changes in said potential difference so that said beam is moved back and forth across said line as it is moved therealong, and defocusing said beam at the end of said latter revolution when said beam again reaches said one angular position.

6. The method defined in claim 5 further characterized by varying the angular velocity of said beam about said point during said later revolution thereof so as to maintain a substantially constant linear velocity of said beam relative to said line.

7. The method of controlling the movement of a beam of electrically charged particles, said method comprising the steps of producing a beam of electrically charged particles directed generally in the direction of a given axis and deflectable relative thereto so as to have a field of movement in a plane perpendicular to said axis, positioning an article so that a given line thereon is within said field of movement, providing an electrically conductive zone adjacent one side of said given line which zone is electrically connected with said article through an electrical resistance so that a substantially different potential difference is produced between said article and said zone when said zone is struck by said beam than when said article is struck by said beam, the value of said potential difference therefore indicating the side of said line on which said beam is located, and controlling the deflection of said beam relative to said given axis to provide movement thereof within said field of movement in response to said potential difference, said line of said article being a closed line, and said step of controlling the deflection of said beam relative to said given axis in response to the potential difference existing between said article and said electrode comprising the substeps of directing said bea min a defocused condition toward a point located within the area enclosed by said line, dedirecting said beam in a defocused condition toward a radius circular path about said point and located entirely within the area enclosed by said line, in superposition with said first circular movement of said beam deflecting said beam in a secondary circular movement at an angular velocity many times higher than that of said first circular movement, focusing said beam when it reaches a given angular position in its first circular movement, comparing said potential difference with a reference voltage, integrating the result of said comparison to obtain a control voltage, immediately after said focusing and throughout the following revolution of said beam in its first circular motion varying the radius of said first circular movement in response to variations in said control voltage, and defocusing said beam when it again reaches said one angular position.

8. The method defined in claim 7 further characterized by varying the angular velocity of said beam about said point during said revolution thereof so as to maintain a substantially constant linear velocity of said beam relative to said line.

9. A beam path control means for causing a beam of electrically charged particles directed generally in the direction of a given axis to follow a line on an article positioned in a field generally perpendicular to said given axis and over which said beam is movable, said path control means comprising means for producing a first voltage signal when said beam is positioned on one side of said line and for producing a second voltage signal when said beam is positioned on the other side of said line, means for moving said beam in a fundamental manner generally in the direction of said line and relative to a reference located on one side of said line, and means responsive to said first and second voltage signals for controlling the displacement of said beam from said reference while said beam undergoes said fundamental motion, said means responsive to said first and second voltage signals for controlling the displacement of said beam from said reference including first means responsive to the existence of said first voltage signal for rapidly moving said beam in a direction which changes said displacement, means for terminating said rapid change in response to the appearance of said second voltage signal, means for slowly moving said beam in the opposite direction following the termination of said rapid change, a delay means inhibiting the operation of said first means during said delay period.

10. A beam path control means for causing a beam of electrically charged particles directed generally in the direction of a given axis to follow a line on an article positioned in a field generally perpendicular to said given axis and over which said beam is movable, said path control means comprising means for producing a first voltage signal when said beam is positioned on one side of said line and for producing a second voltage signal when said beam is positioned on the other side of said line, means for moving said beam in a fundamental manner generally in the direction of said line and relative to a reference located on one side of said line, and means responsive to said first and second voltage signals for controlling the displacement of said beam from said reference while said beam undergoes said fundamental motion, said means responsive to said first and second voltage signals for controlling the displacement of said beam from said reference including means for moving said beam in a circular manner in superposition with said fundamental motion, means for comparing the waveform of said first and second voltage signals with a reference voltage, means for integrating the result of said comparison to obtain a control voltage, and means responsive to said control voltage for increasing said displacement of said beam when said control voltage changes in one direction and for decreasing said displacement of said beam when said control voltage, and means responsive to said control 11. A beam path control means for causing a beam of electrically charged particles to follow with a stitching motion a line on an article positioned in the field over which said beam is movable, said path control means being adapted for use with a beam generator including a first means for deflecting said beam along one axis of said field of beam movement and a second axis for deflecting said beam along a second axis generally perpendicular to said one axis, said path control means being further adapted for use with an article such as aforesaid combined with means providing an electrically conductive zone positioned adjacent one side of said line which zone is electrically connected with said article through an electrical resistance so that the potential difference between said zone and said article is one value when said beam is on one side of said line and is of a different value when said beam is on the other side of said line, said path control means comprising means producing a fundamental signal which when applied to said deflection means causes said beam to move in a fundamental manner generally in the direction of said line, and means for modifying said fundamental signal in response to changes in said potential difference to produce a modified signal which when applied to said deflection means causes said beam to generally follow said line on said article and to alternately shift between said zone and said article, said beam path control means being further characterized by said means for producing a fundamental signal being a sine function generator for producing first and second function signals 90° out of phase so as to cause said beam to move in a fundamental circular path, when applied respectively to said first and second deflecting means, and said means for modifying said fundamental signal including means for varying the amplitudes of said first and second sine function signals, said means for varying the amplitudes of said first and second sine function signals including multiplier circuits for varying said amplitudes in accordance with the value of an input signal, and means for producing such an input signal, said latter means including a first means for rapidly changing the value of said input signal in response to a value of said potential difference indicating the presence of said beam on said article, means for terminating said rapid change in response to a value of said potential difference indicating the presence of said beam on said zone, means for slowly linearly changing the value of said input signal in the opposite direction following the termination of said rapid change, a delay means providing a delay period following the termination of said rapid change, and means inhibiting the operation of said first means during said delay period.

12. A beam path control means for causing a beam of electrically charged particles to follow with a stitching motion a line on an article positioned in the field over which said beam is movable, said path control means being adapted for use with a beam generator including a first means for deflecting said beam along one axis of said field of beam movement and a second axis for deflecting said beam along a second axis generally perpendicular to said one axis, said path control means being further adapted for use with an article such as aforesaid combined with means providing an electrically conductive zone positioned adjacent one side of said line which zone is electrically connected with said article through an electrical resistance so that the potential difference between said zone and said article is one value when said beam is on one side of said line and is of a different value when said beam is on the other side of said line, said path control means comprising means producing a fundamental signal which when applied to said deflections means causes said beam to move in a fundamental manner generally in the direction of said line, and means for modifying said fundamental signal in response to changes in said potential difference to produce a modified signal which when applied to said deflection means causes said beam to generally follow said line on said article and to alternately shift between said zone and said article, said beam path control means being further characterized by said means for producing a fundamental signal being a sine function generator for producing first and second sine function signals 90° out of phase so as to cause said beam to move in a fundamental circular path, when applied respectively to said first and second deflecting means, and said means for modifying said fundamental signal including means for varying the amplitudes of said first and second sine function signals, said means for varying the amplitudes of said first and second sine function signals including multiplier circuits for varying said amplitudes in accordance with the value of an input signal, and means for producing such an input signal, said latter means including means for superimposing a secondary signal on said fundamental signal to cause said beam to move in a secondary circular manner at an angular velocity many times greater than that of said fundamental circular motion, means for comparing the potential difference existing between said zone and said article with a reference voltage, and means for intergrating the result of said comparison.

13. A beam path control means for causing a beam of electrically charged particles to follow with a stitching motion a line on an article positioned in the field over which said beam is movable, said path control means being adapted for use with a beam generator having deflection means for controlling the deflection of said beam relative to said field of movement, said path control means being further adapted for use with an article such as aforesaid combined with means providing an electrically conductive zone positioned adjacent one side of said line which zone is electrically connected with said article through an electrical resistance so that the potential difference between said zone and said article is one value when said beam is on one side of said line and is of a different value when said beam is on the other side of said line, said path control means comprising means for producing a fundamental signal which when applied to said deflection means causes said beam to move in a fundamental manner generally in the direction of said line, and means for modifying said fundamental signal in response to changes in said potential difference to produce a modified signal which when applied to said deflection means causes said beam to generally follow said line on said article and to alternately shift between said zone and said article, said means for producing a fundamental signal being a device for producing a signal which causes said beam to move in a fundamental circular manner, and said means for modifying said fundamental signal including means for superimposing a secondary signal on said fundamental signal to cause said beam to move in a secondary circular manner at an angular velocity many times greater than that of said fundamental circular motion, means for comparing the potential difference existing between said zone and said article with a reference voltage, means for integrating the result of said comparison to produce a control signal, and means responsive to said control signal for varying said fundamental signal in such a manner as to vary the radius of said fundamental circular motion.

14. A beam path control means for causing a beam of electrically charged particles to follow with a stitching motion a line on an article positioned in the field over which said beam is movable, said beam path control means being adapted for use with a beam generator having deflection means including a first means for deflecting said beam along one axis of said field of beam movement and a second means of deflecting said beam along a second axis generally perpendicular to said one axis, said path control means being further adapted for use with an article such as aforesaid combined with means providing an electrically conductive zone positioned adjacent one side of said line which zone is electrically connected with said article through an electrical resistance so that the potential difference betwen said zone and said article is one value when said beam is one one side of said line and is of a different value when said beam is on the other side of said line, said path control means comprising means for producing a fundamental signal which when applied to said deflection means causes said beam to move in a fundamental manner generally in the direction of said line, and means for modifying said fundamental signal in response to changes in said potential difference to produce a modified signal which when applied to said deflection means causes said beam to generally follow said line on said article and to alternately shift between said zone and said article, said beam path control means being further characterized by said means for producing a fundamental signal being a sine function generator for producing first and second sine function signals 90° out of phase so as to cause said beam to move in a fundamental circular path when applied respectively to said first and second deflecting means, and said means for modifying said fundamental signal including means for superimposing a secondary signal on said fundamental signal to cause said beam to move in a secondary circular manner at an angular velocity many times greater than that of said fundamental circular motion, means for comparing the potential difference existing between said zone and said article with a reference voltage, means for integrating the result of said comparison, and means for increasing the amplitudes of said first and second sine function signals when the result of the integration made by the latter means changes in one direction and for decreasing the amplitudes of said first and second sine function signals when said result changes in the opposite direction.

References Cited

UNITED STATES PATENTS

| | | | |
|---|---|---|---|
| 3,112,391 | 11/1963 | Sciaky | 219—121 |
| 3,165,619 | 1/1965 | Cohen | 219—121 |
| 3,258,576 | 6/1966 | Schleich et al. | 219—121 |
| 3,408,474 | 10/1968 | Downing | 219—121 |
| 3,134,892 | 5/1964 | Opitz et al. | 219—121 |
| 3,146,335 | 8/1964 | Samuelson | 219—121 |
| 3,148,265 | 9/1964 | Hansen | 219—121 |
| 3,152,238 | 10/1964 | Anderson | 219—121 |
| 3,172,989 | 3/1965 | Nelson | 219—121 |
| 3,257,555 | 6/1966 | Klebba | 219—121 |
| 3,268,812 | 8/1966 | Meyer et al. | 219—121 |
| 3,291,959 | 12/1966 | Schleich | 219—121 |
| 3,301,949 | 1/1967 | Ullery | 219—121 |

OTHER REFERENCES

Werner C. Theiler: "Electron Beam Welding Solves Relay Sealing Problems," Electronics, June 28, 1963.

"E–B Pays as Production Welder," Reprint from Metal Working, September 1963, vol. 9, No. 9.

JOSEPH V. TRUHE, Primary Examiner

W. DEXTER BROOKS, Assistant Examiner

PO-1050
(5/69)

UNITED STATES PATENT OFFICE
CERTIFICATE OF CORRECTION

Patent No. 3,492,456      Dated January 27, 1970

Inventor(s) Arthur R. Emery

It is certified that error appears in the above-identified patent and that said Letters Patent are hereby corrected as shown below:

Col. 2, line 18, "in" should read --of--.
Col. 5, line 9, after "beam" insert --the--.
Col. 7, line 23, "serve" should read --serves--.
Col. 10, line 29, delete "with"; line 40, the first "6" should read --9--; line 51, "tribbers" should read --triggers--.
Col. 13, line 18, after "has" insert --as--.

Claim 5, Col. 20, line 8, "electrical" should read --electrode--.
Claim 7, Col. 20, line 51, "bea min" should read --beam in--; lines 52-53, delete "de- directing said beam in a defocused condition toward a" and insert --deflecting said beam to cause it to move in a minimum--.
Claim 9, Col. 21, lines 22-23, after ",a delay means" insert --providing a delay period following the termination of sa rapid change, and means--.
Claim 10, Col. 21, line 51, delete "and means responsive to said control" and insert --changes in the opposite direction--.
Claim 11, Col. 22, line 6, after "second" insert --sine--.
Claim 14, Col. 23, line 47, "of" should read --for--; line 54, "betwen" should read --between--; line 55, "one one side" should read --on one side--; Col 24, line 9, "betwen" should read --between--.

SIGNED AND
SEALED
JUN 30 1970

(SEAL)
Attest:

Edward M. Fletcher, Jr.
Attesting Officer

WILLIAM E. SCHUYLER, JR.
Commissioner of Patents